United States Patent [19]

Suzuki

[11] Patent Number: 5,907,632
[45] Date of Patent: *May 25, 1999

[54] IMAGE INFORMATION COMMUNICATION APPARATUS FOR NOTIFYING THAT AN OCR METHOD IS APPLICABLE TO IMAGE DATA TO BE TRANSMITTED

[75] Inventor: Hironobu Suzuki, Yokohama, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,203

[22] Filed: Jun. 12, 1996

[30] Foreign Application Priority Data

Jun. 20, 1995 [JP] Japan .................... 7-175657
Feb. 2, 1996 [JP] Japan .................... 8-039096

[51] Int. Cl.$^6$ .................... H04N 1/32
[52] U.S. Cl. .................... 382/187; 358/434; 358/436; 358/438
[58] Field of Search .................... 358/434–440, 358/403, 470; 382/187; 379/93, 100, 93.31, 100.05, 100.06; H04N 1/32

[56] References Cited

U.S. PATENT DOCUMENTS

| | | | |
|---|---|---|---|
| 5,153,744 | 10/1992 | Nobuta | 358/403 |
| 5,224,180 | 6/1993 | Tadokoro | 358/434 |
| 5,418,625 | 5/1995 | Shimoosawa | 358/434 |
| 5,585,938 | 12/1996 | Imamura | 358/436 |
| 5,627,661 | 5/1997 | Negishi et al. | 358/403 |

*Primary Examiner*—Kim Yen Vu
*Attorney, Agent, or Firm*—Oblon, Spivak, McClelland, Maier & Neustadt, P.C.

[57] ABSTRACT

An image information communication apparatus notifies a remote terminal that an optical character reading process is applicable to image data to be transmitted. The optical character reading process is applied to convert raster image data corresponding to characters into predetermined character code data. Image data obtained by raster scanning an original document is transmitted to the remote terminal through a communication network. Notification information indicating that the optical character reading process is applicable to the image data to be transmitted is sent to the remote terminal prior to the transmission of the image data.

16 Claims, 15 Drawing Sheets

IMAGE INFORMATION COMMUNICATION APPARATUS FOR NOTIFYING THAT AN OCR METHOD IS APPLICABLE TO IMAGE DATA TO BE TRANSMITTED

BACKGROUND OF THE INVENTION

1. Field of the Invention

The present invention generally relates to an image information communication apparatus and, more particularly, to an image information communication apparatus such as a facsimile apparatus which can send a notification to a remote facsimile apparatus during a communication protocol procedure.

2. Description of the Related Art

Generally, a facsimile apparatus scans an original document by using a scanner to obtain image data (referred to as raster data), and the image data is encoded and compressed by a predetermined encoding system and is sent to a remote terminal. In the remote terminals, the received image data is decoded to the original image data. The decoded original data is supplied to a printer to output a hard copy of the received image data.

The scanner reading an original document uses a line image sensor as a reading head so as to read the original image line by line with a predetermined resolution (resolution in a secondary scanning direction). The line image sensor reads an image of a single line with a predetermined resolution which corresponds to the number of photoreceiving elements provided in the line image sensor along a primary scanning direction.

If the magnitude of the resolutions in the primary scanning direction and the secondary scanning direction are not sufficiently large, a pixel structure undesirably appears in a printed image. Especially, a zigzag pattern appears in a diagonal line to the primary or secondary scanning direction, resulting in poor image quality.

In order to eliminate such a problem, the resolutions in the primary and secondary scanning directions may be increased. However, such a method increases a manufacturing cost of the printer and the scanner.

On the other hand, an OCR facsimile apparatus having an optical character reading (OCR) function has been developed and is available on the market. The OCR facsimile apparatus applies the OCR process to received image data which was obtained from a character image so as to convert the image data into character code data. Since an output from a printer is based on character pattern data generated by a character image generating means such as a font memory, the above mentioned zigzag pattern does not exist in the characters printed by the printer. Thus, the character image can be output with high image quality.

However, the OCR facsimile apparatus has the following problem. That is, the image data received from a remote terminal may contain not only character image data but also pattern image data. If the OCR process is applied to the pattern image data which does not correspond to characters, the original pattern image cannot be restored. More specifically, if the original document contains characters according to a predetermined font and an image such as a handwritten illustration and the like and if the image data is applied with the OCR process, the characters can be printed out through the OCR process but the handwritten illustration cannot be printed out as it was in the original image.

Additionally, image data received from a remote terminal may be applied with a halftone process which may be applied to obtain better image quality for a photographic image and the like. If the character image is applied with the halftone process, the edge of characters may be faded. This may cause a problem in that an appropriate character pattern recognition cannot be performed in the OCR process.

SUMMARY OF THE INVENTION

It is a general object of the present invention to provide an improved and useful image information communication apparatus in which the above-mentioned problems are eliminated.

A more specific object of the present invention is to provide an image information communication apparatus in which the optical character reading process can be appropriately applied to image data so that the optical character reading process is not applied to image data obtained from an original document containing illustrations or photographic images.

Another object of the present invention is to provide an image information communication apparatus which can notify a remote terminal that the optical character reading process is applicable to image data to be transmitted.

In order to achieve the above-mentioned objects, there is provided according to the present invention an image information communication apparatus communicating with a remote terminal through a communication network, a predetermined communication protocol procedure being executed to establish a communication channel, the image information communication apparatus comprising;

- image input means for inputting image data to be transmitted, the image data being obtained by raster scanning an original document;
- transmission means for transmitting the image data to the remote terminal through the communication network; and
- notification means for sending to the remote terminal notification information indicating that an optical character reading process is applicable to the image data to be transmitted, the optical character reading process being applied to convert raster image data corresponding to characters into predetermined character code data.

According to the above-mentioned invention, the remote terminal can apply the optical character reading process to the received image data by referring to the notification information sent from the image information communication apparatus. If the notification information is not received or if the notification information indicates that the optical character reading process is not applicable, the remote terminal may not apply the optical character reading process to the received image data so as to eliminate a possible problem caused by applying the optical character reading process to image data corresponding to illustrations or photographic images.

The image information communication apparatus may further comprise instruction input means for inputting an instruction indicating that the optical character reading process is applicable to the image data to be transmitted, the instruction being input by a user of the image information communication apparatus.

Since the user, who is sending image information to the remote terminal through the image information communication apparatus, should know the contents of the original document, the instruction input by the user may be the simplest way to notify the remote terminal that the optical character reading process is applicable to the image data to be transmitted.

Additionally, the image information communication apparatus may further comprise inquire means for inquiring of a user whether or not the optical character reading process is applicable to the image data to be transmitted by displaying a message to the user.

Further, the notification information may be included in a protocol signal for establishing the communication channel.

Additionally, the image information communication apparatus may further comprise first conversion means for applying the optical character reading process to image data received from the remote terminal based on notification information received from the remote terminal so as to obtain character code data corresponding to the image data received from the remote terminal.

Additionally, the image information communication apparatus may further comprise a printer printing a character image based on the character code data.

Further, the image information communication apparatus may further comprise means for sending to the remote terminal response information indicating that the image information communication apparatus has a function to perform the optical character reading process. The response information may be included in a protocol signal for establishing the communication channel.

Additionally, the image information communication apparatus may further comprise second conversion means for applying the optical character reading process to the image data to be transmitted so as to obtain character code data corresponding to the image data to be transmitted when the response information is received from the remote terminal and when the instruction is input by the user.

The image information communication apparatus may further comprise a printer printing a character image based on character code data received from the remote terminal.

Additionally, the image information communication apparatus may further comprise means for determining applicability of the optical character reading process to the image data to be transmitted.

Further, the image information communication apparatus may further comprise means for determining applicability of the optical character reading process to image data received from the remote terminal.

Further, in the image information communication apparatus, the notification information may include information regarding an image reading mode used when the image data to be transmitted is generated. The image reading mode may include an optical character reading mode and a halftone mode.

Other objects, features and advantages of the present invention will become more apparent from the following detailed description when read in conjunction with the accompanying drawings.

DETAILED DESCRIPTION OF THE PREFERRED EMBODIMENTS

Figure 1:
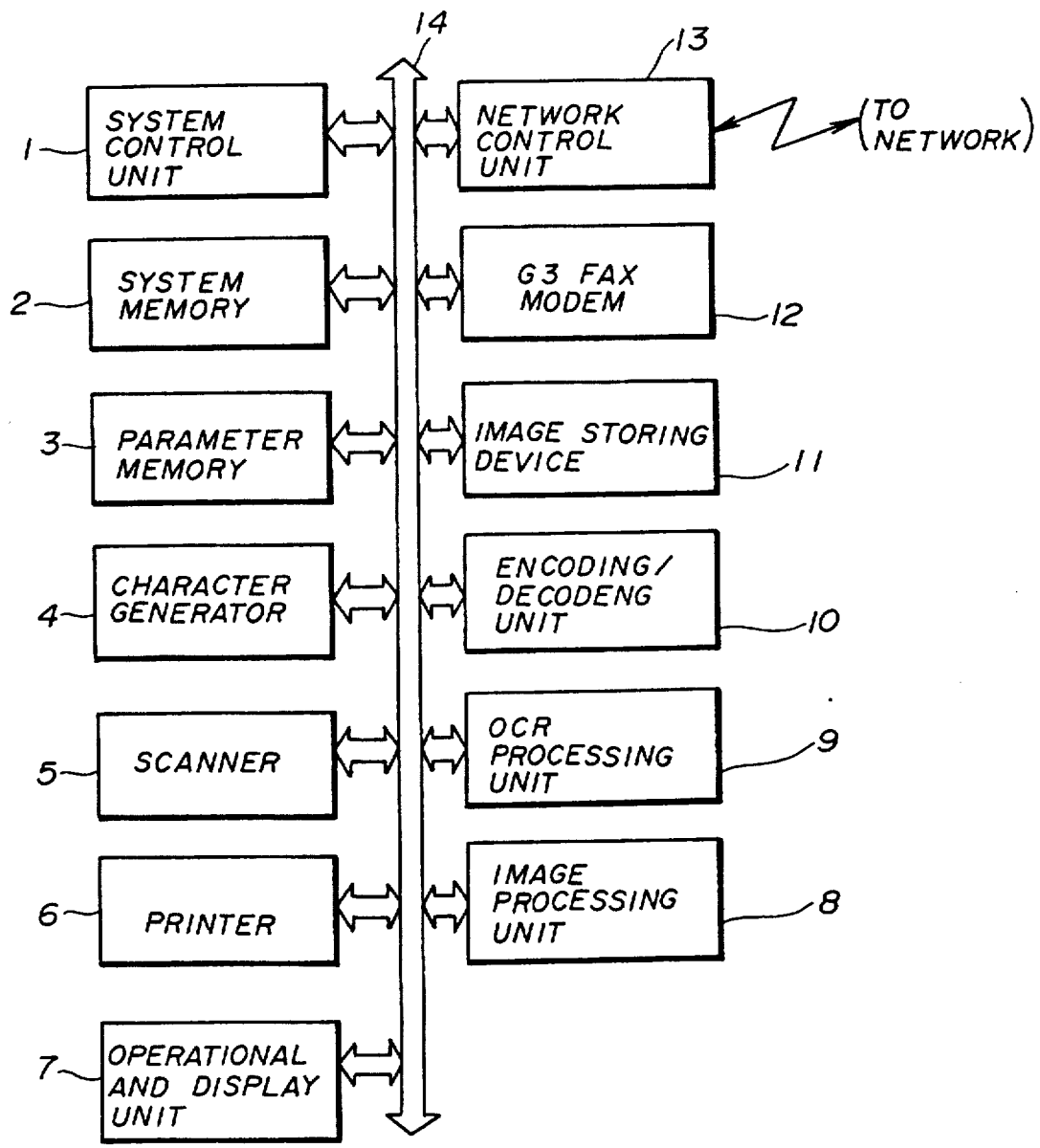
FIG. 1 is a block diagram of a G3 facsimile apparatus according to a first embodiment of the present invention.

A description will now be given, with reference to FIG. 1, of a first embodiment of the present invention. FIG. 1 is a block diagram of a G3 facsimile apparatus according to the first embodiment of the present invention.

As shown in FIG. 1, the G3 facsimile apparatus according to the first embodiment of the present invention comprises a system control unit 1, a system memory 2, a parameter memory 3, a character generator 4, a scanner 5, a printer 6, an operational and display unit 7, an image processing unit 8, an OCR processing unit 9, an encoding/decoding unit 10, an image storing device 11, a G3 FAX modem 12 and a network control unit 13.

The system control unit 1 controls an entire operation of the facsimile apparatus. The system control unit 1 further controls a facsimile transmission control procedure including an error correction mode (ECM) transmission procedure and a binary file transfer (BFT) transmission procedure according to ITU-T Recommendation T.30. The system memory 2 stores process programs executed by the control unit 1 and various sets of data necessary for executing the process programs. The system memory also provides a work area for the control unit 1. The parameter memory 3 stores various sets of information specific to the facsimile apparatus.

In the ECM transmission procedure, image information to be sent is divided into frames each having a predetermined size (for example, 256B) on a transmitter side. Each of the frames is converted into a predetermined data frame format, and is sent to a remote terminal which is on a receiver side. The receiver detects an error in the received frame data so as to notify the transmitter of the number of frame data in which the error was detected. The transmitter then sends the frame data corresponding to the number of the frame data notified by the receiver. This operation is repeated so that the receiver receives image information without errors.

The ECM transmission procedure and the BFT transmission procedure are defined in the Appendix of ITU-T Recommendation T.30 and are well-known in the art, and thus detailed descriptions of these procedures are omitted.

The character generator 4 generates font data used for output characters according to a predetermined character code system. The scanner 5 reads an original document image according to a predetermined resolution. The printer 6 outputs an image either in an image recording mode or a character code recording mode. In the image recording mode, raster image data is printed with a predetermined resolution. In the character code recording mode, a character image corresponding to the character code data is printed with the same resolution. The operational and display unit 7 comprises various operational keys and various display units so that a user can operate the facsimile apparatus.

The image processing unit 8 has various image processing functions such as an image determining function and an image data generating function. The image determining function is provided for determining whether or not the image data corresponds to a character image. The image data generating function is provided for converting received image data into image data to be supplied to the printer 6 according to character code data so as to print the image data according to the character code.

The OCR processing unit 9 applies a known predetermined OCR process to the received image data so as to output a character code according to a predetermined character code system.

The encoding/decoding unit 10 encodes and compresses the image data to be transmitted, and decodes and expands encoded and compressed image data to original image data. The image storing device 11 stores a number of sets of encoded and compressed image data.

The G3 FAX modem 12 is used to realize the G3 facsimile communication. The G3 FAX modem 12 has a low-speed modem function such as a V.21 modem function for transmitting transmission procedure signals and a high-speed modem function such as a V.17 modem function, a V.33 modem function, a V.29 modem function or a V.27ter modem function for transmitting mainly image information.

The network control unit 13 directly connects the G3 facsimile apparatus to a public service telephone network. The network control unit may have an automatic calling and receiving function.

The system control unit 1, the system memory 2, the parameter memory 3, the character generator 4, the scanner 5, the printer 6, the operational and display unit 7, the image processing unit 8, the OCR processing unit 9, the encoding/decoding unit 10, the image storing device 11, the G3 FAX modem 12 and the network control unit 13 are interconnected by a bus 14. Thus, information can be transmitted among those parts via the bus 14. Additionally, the G3 FAX modem 12 can directly communicate with the network control unit 13.

Figure 2:
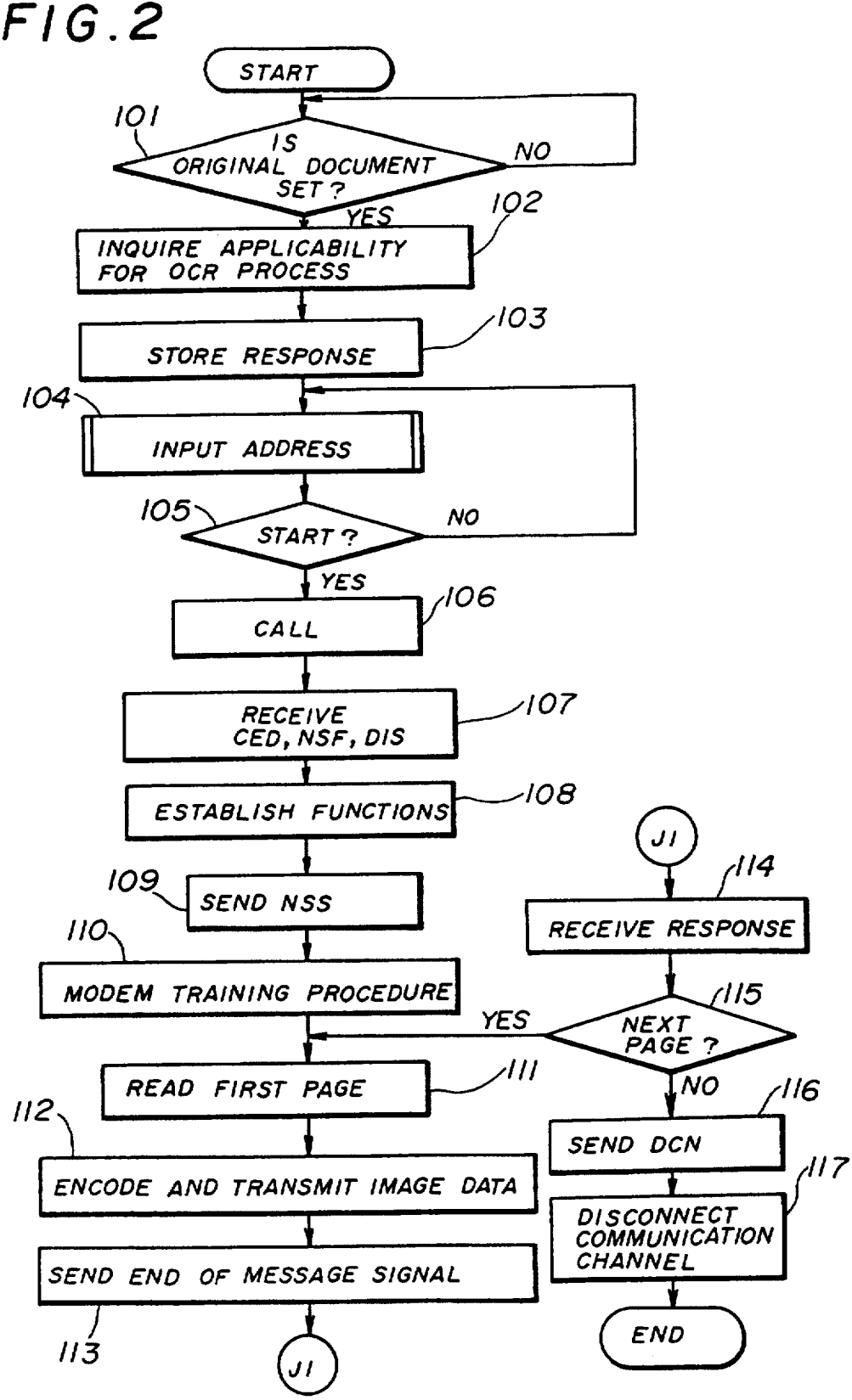
FIG. 2 is a flowchart of a transmitting operation of the G3 facsimile apparatus according to the first embodiment of the present invention.

A description will now be given, with reference to FIG. 2, of an operation of the G3 facsimile apparatus according to the first embodiment of the present invention. FIG. 2 is a flowchart for explaining an operation of the G3 facsimile apparatus according to the first embodiment of the present invention.

When the operation shown in FIG. 2 is started, it is determined, in step 101, whether or not an original document is set in the scanner 5. If it is determined that the original document is set in the scanner 5, the routine proceeds to step 102. In step 102, a guidance message is displayed to a user so as to inquire whether or not the original document is applicable with the OCR process. A response input from the user is stored in a memory, in step 103. That is, when the user determines that the document can be processed by the OCR process and inputs a signal representing such a determination, the facsimile apparatus stores the fact that image data to be transmitted is applicable with the OCR process. This may occur when the original document contains only character images according to a predetermined character font system. On the other hand, if the user determines that the document cannot be processed by the OCR process and inputs a signal representing such a determination, the facsimile apparatus stores the fact that image data to be transmitted is not applicable with the OCR process. This may occur, for example, when the original document contains an illustration or a photograph which cannot be processed by the OCR process.

In step 104, a dial number is input by the user, and then it is determined, in step 105, whether or not a start key (not shown) is pressed. If it is determined that the start key is pressed, the routine proceeds to step 106. In step 106, a calling operation is started according to the dial number input in step 104.

In step 107, the facsimile apparatus receives a called station identification signal CED (a tone signal), a non-standard facilities signal NSF (a binary signal) and a digital identification signal DIS (a binary signal) form the called terminal. The called station identification signal CED is a signal for notifying a calling terminal that a called terminal is a non-audio terminal. The non-standard facilities signal NSF is a signal for notifying a calling terminal of non-standard functions provided in a called terminal. The digital identification signal DIS is a signal for notifying a calling terminal of standard functions provided in a called terminal.

In step 108, the system control unit 1 establishes functions to be used in accordance with the non-standard facilities signal NSF and the digital identification signal DIS received from the remote terminal. For example, if the received NSF includes information indicating that the OCR function is available and if the OCR process is applicable to the image information, use of the OCR function is set to the facsimile apparatus. Additionally, a modem speed, resolution of image, an encoding mode, a transfer mode (ECM, BFT, non-ECM) and an image size may be set which are necessary for transmitting image information.

In step 109, a non-standard facilities set-up signal NSS is generated and sent so as to notify the remote terminal of the transmission function and the apparatus function that has been established in the local terminal. In step 110, a modem training procedure is executed at a designated modem speed so as to determine the modem speed to be used.

After the preparation for transmitting image information is completed as mentioned above, a first page of the original document is read, in step 111, by the scanner 5. Then, in step 112, the image data output from the scanner 5 is encoded and compressed according to the designated encoding mode, and the encoded and compressed image data is sent to the remote terminal. Thereafter, an end of message signal is sent, in step 113, to the remote terminal. In step 114, a message confirmation signal is received from the remote terminal.

It is then determined, in step 115, whether or not a next page of the original document is present. If there is a next page, the routine returns to step 111 so as to transmit image data of the next page.

If it is determined, in step 115, that there is not a next page, a disconnect signal DCN is sent to the remote terminal in step 116. Thereafter, the communication channel is disconnected in step 117, and the routine is ended.

Figure 3:
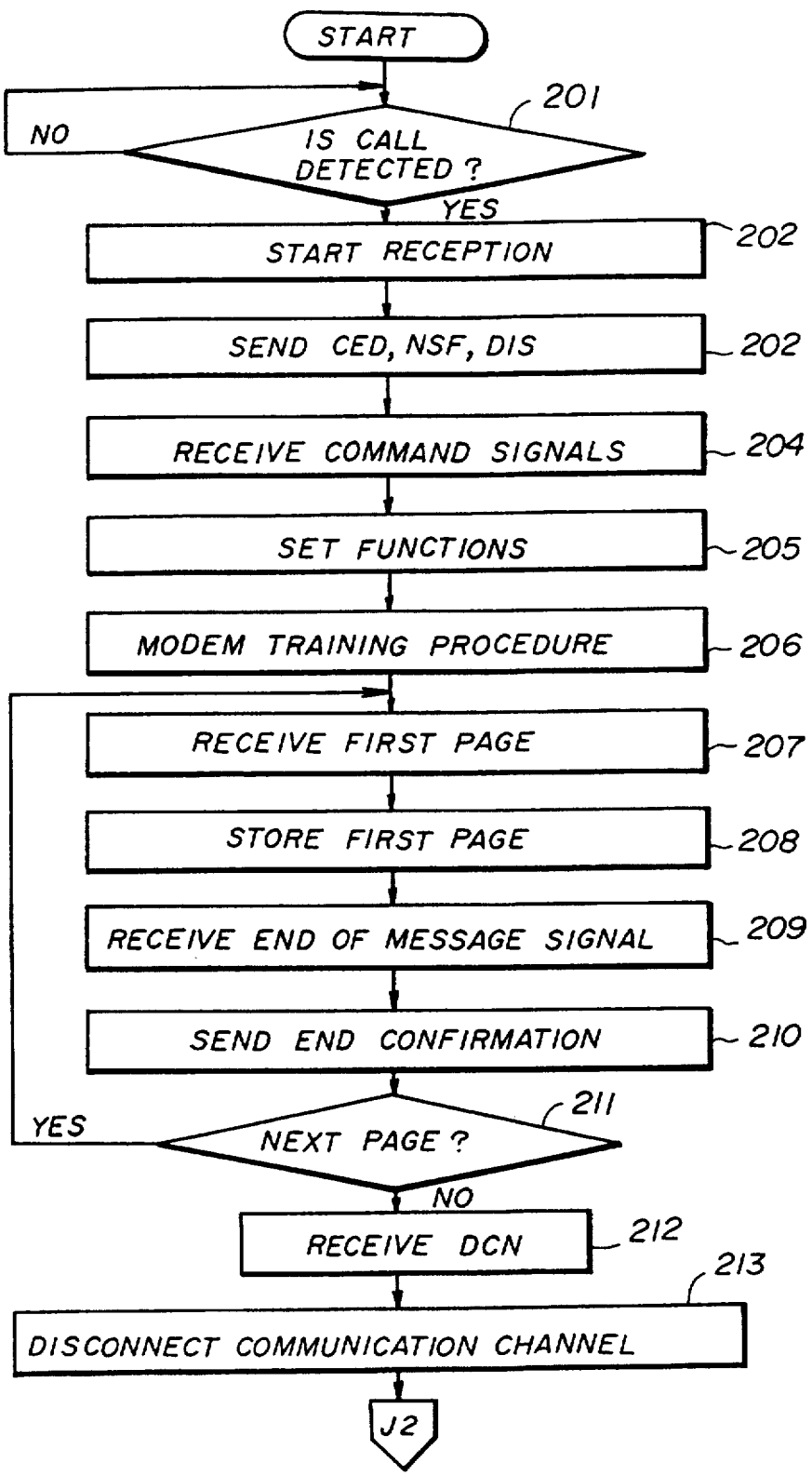
FIGS. 3 and 4 are parts of a flowchart of a receiving operation of the G3 facsimile apparatus according to the first embodiment of the present invention.
Figure 4:
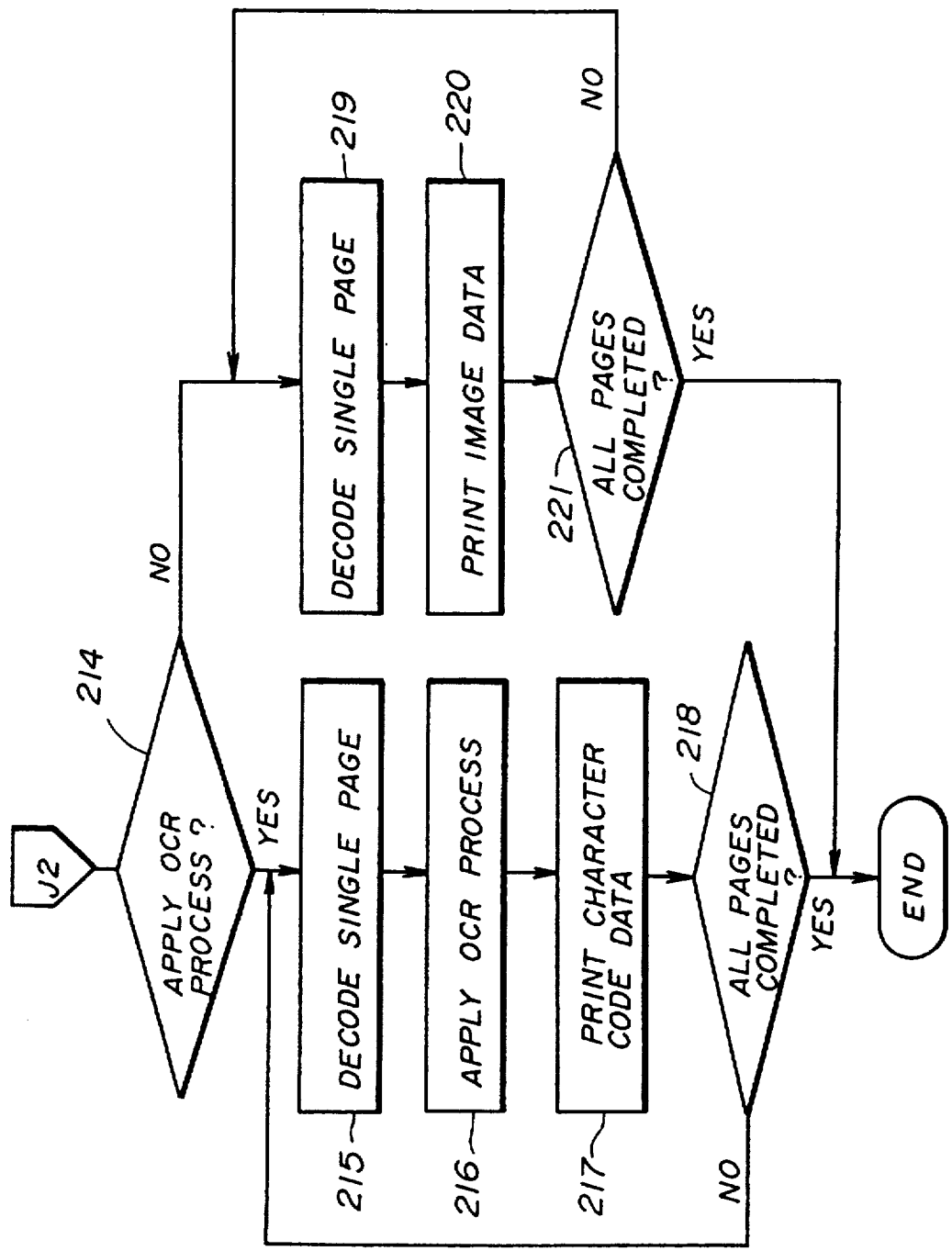

FIGS. 3 and 4 are parts of a flowchart of an operation performed when the G3 facsimile apparatus shown in FIG. 1 receives image information from a remote terminal. That is the operation shown in FIG. 3 is performed when the facsimile apparatus is set as a receiver.

When the operation shown in FIGS. 3 and 4 is started, it is determined, in step 201, whether or not a call is received. If a call from a remote terminal is detected, a response is started in step 202. In step 203, a predetermined call identification signal CED, a non-standard facilities signal and a digital identification signal DIS are sent to the remote terminal which is the calling terminal. Information indicating possession of an OCR function and a printing function of character code data is provided in an information field of the non-standard facilities signal NSF.

Then, in step 204, command signals including a non-standard facilities set-up signal NSS sent from the remote terminal are received to recognize apparatus functions and transmission functions to be used. In step 205, each part of the facsimile apparatus is set to perform the functions. In step 206, a modem training procedure is executed at a designated modem speed so as to determine the modem speed to be used.

Then, image data corresponding to a single page of the original document is received in step 207, and the received image information is stored in step 208. When an end of message signal is received in step 209, a message confirmation signal is sent to the remote terminal in step 210.

It is then determined, in step 211, whether or not image data corresponding to a next page is to be sent from the remote terminal. If it is determined that the image information corresponding to a next page is to be sent from the remote terminal, the routine returns to step 207 so as to receive the image data corresponding to the next page. If it is determined that there is not a next page of the original document, a disconnection signal DCN is received in step 212, and then the communication channel is disconnected in step 213.

It is then determined, in step 214, whether or not the OCR function is applicable to the image data received from the remote terminal. If it is determined that the OCR process is applicable, the image data corresponding to a single page is decoded by the encoding/decoding unit 10 in step 215. Then the OCR process is applied to the decoded image data, in step 216, so as to generate character code data corresponding to the image data. The character code data is supplied, in step 217, to the printer 6 so as to print out the image data of the original document.

It is then determined, in step 218, whether or not the printing operation of the image data corresponding to all pages received from the remote terminal has been completed. If it is determined that there is remaining image data for another page, the routine returns to step 215 so as to print out another page. If it is determined, in step 218, that there is no remaining image data to be printed, the routine is ended.

On the other hand, if it is determined, in step 214, that the OCR process is not applicable to the received image data, the routine proceeds to step 219. In step 219, the received image data is decoded by the encoding/decoding unit 10. In step 220, the printer 6 is set in an image recording mode and the decoded image data is supplied to the printer 6 so as to print out the image data in the image recording mode.

It is then determined, in step 221, whether or not the printing operation of the image data corresponding to all pages received from the remote terminal has been completed. If it is determined that there is remaining image data for another page, the routine returns to step 219 so as to print out another page. If it is determined, in step 221, that there is no remaining image data to be printed, the routine is ended.

As discussed above, in the present embodiment, when the user instructs that the OCR process is applicable to the image data and the receiver has the OCR function, the printing operation is performed in the character code data printing mode. Thus, the printed image output from the printer 6 has high image quality when the image data corresponds to only character images. If the transmitted image data includes image data corresponding to an illustration or a photograph which cannot be applied with the OCR process, the user can input information indicating that the image data is not applicable with the OCR process. Thus, an appropriate printing mode is selected for the received image data on the receiver side.

A description will now be given of a second embodiment of the present invention.

In the above-mentioned first embodiment, the OCR process is applied to the received image data on the receiver side. However, the OCR process may be applied on the transmitter side before transmitting the image data. In this case, since the data to be transmitted is converted into the character code data which is greatly reduced in data amount before transmission, a communication cost is greatly reduced. The second embodiment corresponds to such a case. It should be noted that a hardware structure of the facsimile apparatus according to the second embodiment is the same as that of the first embodiment, and the description thereof will be omitted.

Figure 5:
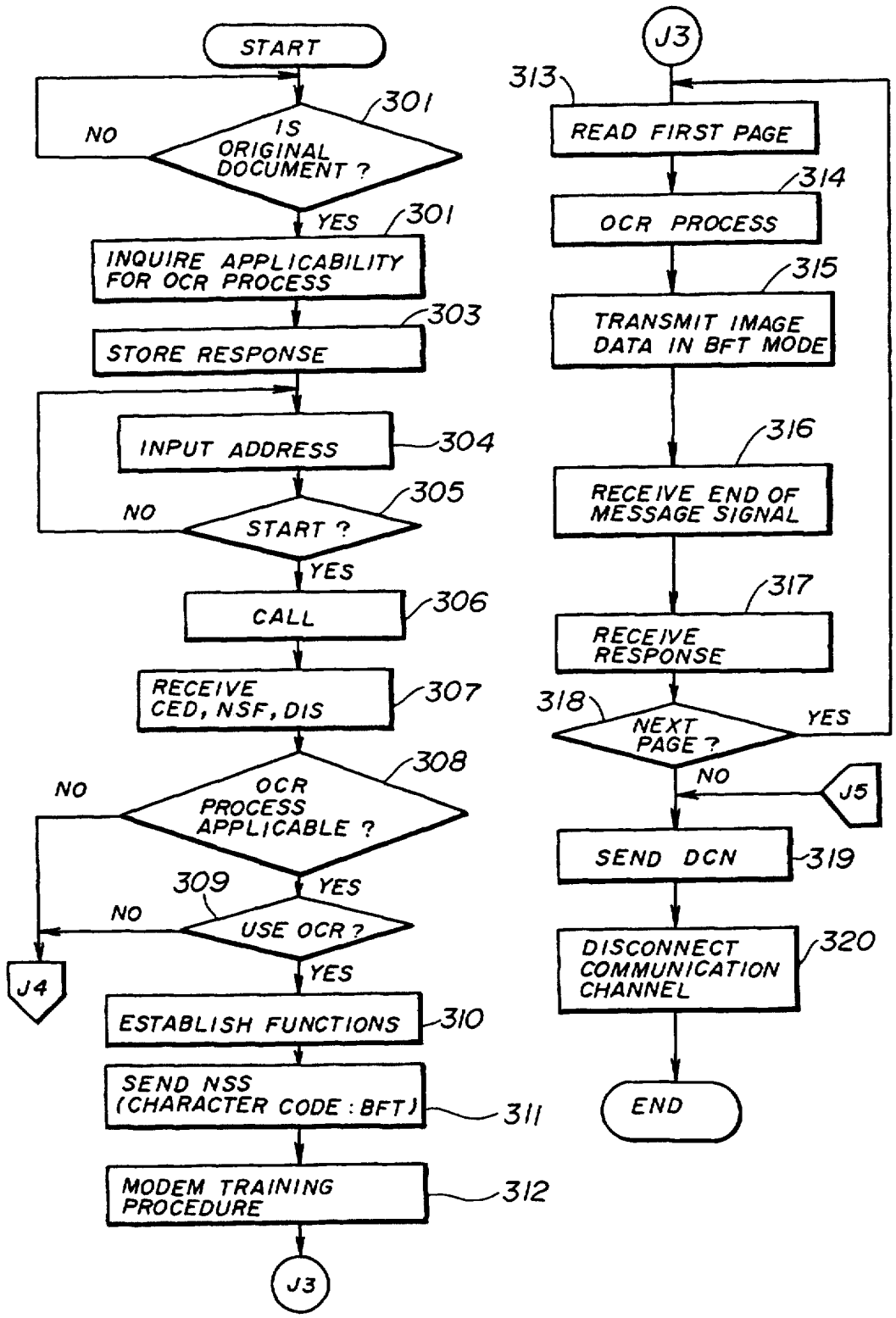
FIGS. 5 and 6 are parts of a flowchart of a transmitting operation of a facsimile apparatus according to a second embodiment of the present invention.
Figure 6:
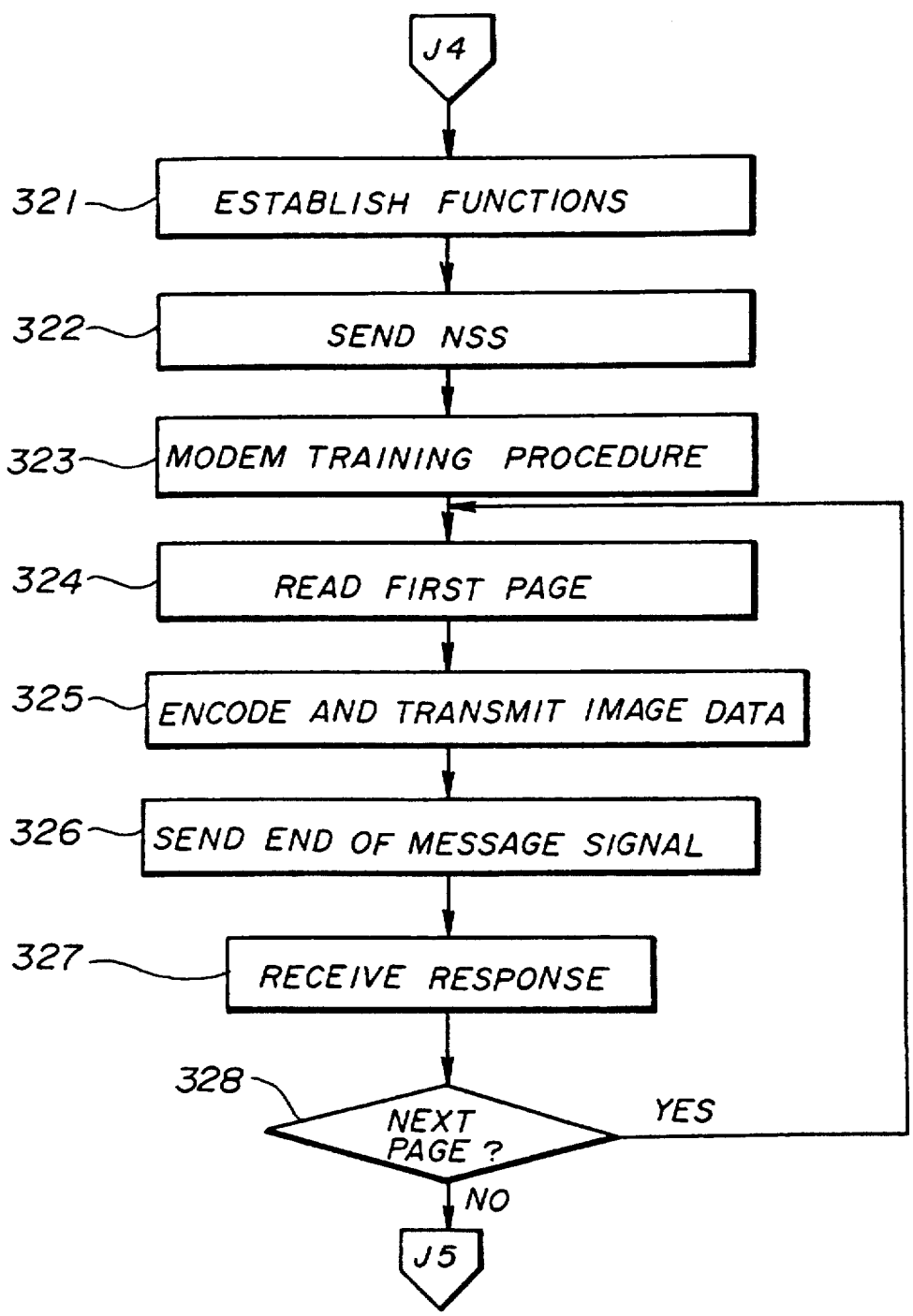

FIGS. 5 and 6 are parts of a flowchart of an operation performed in the facsimile apparatus according to the second embodiment of the present invention.

When the operation shown in FIGS. 5 and 6 is started, it is determined, in step 301, whether or not an original document is set in the scanner 5. If it is determined that the original document is set in the scanner 5, the routine proceeds to step 302. In step 302, a guidance message is displayed to a user so as to inquire whether or not the original document is applicable with the OCR process. A response input from the user is stored in a memory, in step 303. That is, when the user determines that the document can be processed by the OCR process and inputs a signal representing such a determination, the facsimile apparatus stores the fact that image data to be transmitted is applicable with the OCR process. This may occur when the original document contains only character images according to a predetermined character font system. On the other hand, if the user determines that the document cannot be processed by the OCR process and inputs a signal representing such a determination, the facsimile apparatus stores the fact that image data to be transmitted is not applicable with the OCR process. This may occur, for example, when the original document contains an illustration or a photograph which cannot be processed by the OCR process.

In step 304, a dial number is input by the user, and then it is determined, in step 305, whether or not a start key (not shown) is pressed. If it is determined that the start key is pressed, the routine proceeds to step 306. In step 306, a calling operation is started according to the dial number input in step 304.

In step 307, the facsimile apparatus receives a called station identification signal CED (a tone signal), a non-standard facilities signal NSF (a binary signal) and a digital identification signal DIS (a binary signal) form the called terminal.

In step 308, the system control unit 1 determines whether or not the non-standard facilities signal NSF includes information indicating that the remote terminal has a function to print out the image data in the character code data printing mode. If it is determined that the non-standard facilities signal NSF includes such information, the routine proceeds to step 309. In step 309, it is determined whether or not the user instructed that the OCR process is applicable to the image data. If it is determined that the OCR process is applicable, the routine proceeds to step S310.

In step 310, the system control unit 1 establishes a transmission function and an apparatus function to be used. In this case, designation of a character code data recording may be set as an apparatus function and a modem speed, a resolution of image, an encoding mode, a transfer mode (BFT in this case) and an image size may be set as transmission functions which are necessary for transmitting image information.

Then, in step 311, a non-standard facilities set-up signal NSS is generated and sent so as to notify the remote terminal of the transmission function and the apparatus function that has been established in the local terminal. In step 312, a modem training procedure is executed at a designated modem speed so as to determine the modem speed to be used.

After the preparation for transmitting image information is completed as mentioned above, a first page of the original document is read, in step 313, by the scanner 5. Then in step 314, the image data obtained by the scanner 5 is converted into corresponding character code data by the OCR processing unit. The character code data is sent, in step 315, to the remote terminal in a predetermined BFT transmission mode. Thereafter, an end of message signal is sent, in step 316, to the remote terminal. In step 317, a message confirmation signal is received from the remote terminal.

It is then determined, in step 318, whether or not a next page of the original document is present. If there is a next page, the routine returns to step 313 so as to transmit image data of the next page.

If it is determined, in step 318, that there is not a next page, a disconnect signal DCN is sent to the remote terminal in step 319. Thereafter, the communication channel is disconnected in step 320, and the routine is ended.

On the other hand, if the determination in step 318 is negative, or if the determination in step 309 is negative, the routine proceeds to step 321 (refer to FIG. 6). In step 321, the system control unit 1 establishes functions to be used in accordance with the non-standard facilities signal NSF and the digital identification signal DIS received form the remote terminal.

In step 322, a non-standard facilities set-up signal NSS is generated and sent so as to notify the remote terminal of the transmission function and the apparatus function that has been established in the local terminal. In step 323, a modem training procedure is executed at a designated modem speed so as to determine the modem speed to be used.

After the preparation for transmitting image information is completed as mentioned above, a first page of the original document is read, in step 324, by the scanner 5. Then, in step 325, the image data output from the scanner 5 is encoded and compressed according to the designated encoding mode, and the encoded and compressed image data is sent to the remote terminal. Thereafter, an end of message signal is sent, in step 326, to the remote terminal. In step 327, a message confirmation signal is received from the remote terminal.

It is then determined, in step 328, whether or not a next page of the original document is present. If there is a next page, the routine returns to step 324 so as to transmit image data of the next page.

If it is determined, in step 328, that there is not a next page, the routine proceeds to step 319 so as to send a disconnect signal DCN to the remote terminal. Thereafter, the communication channel is disconnected in step 320, and the routine is ended.

Figure 7:
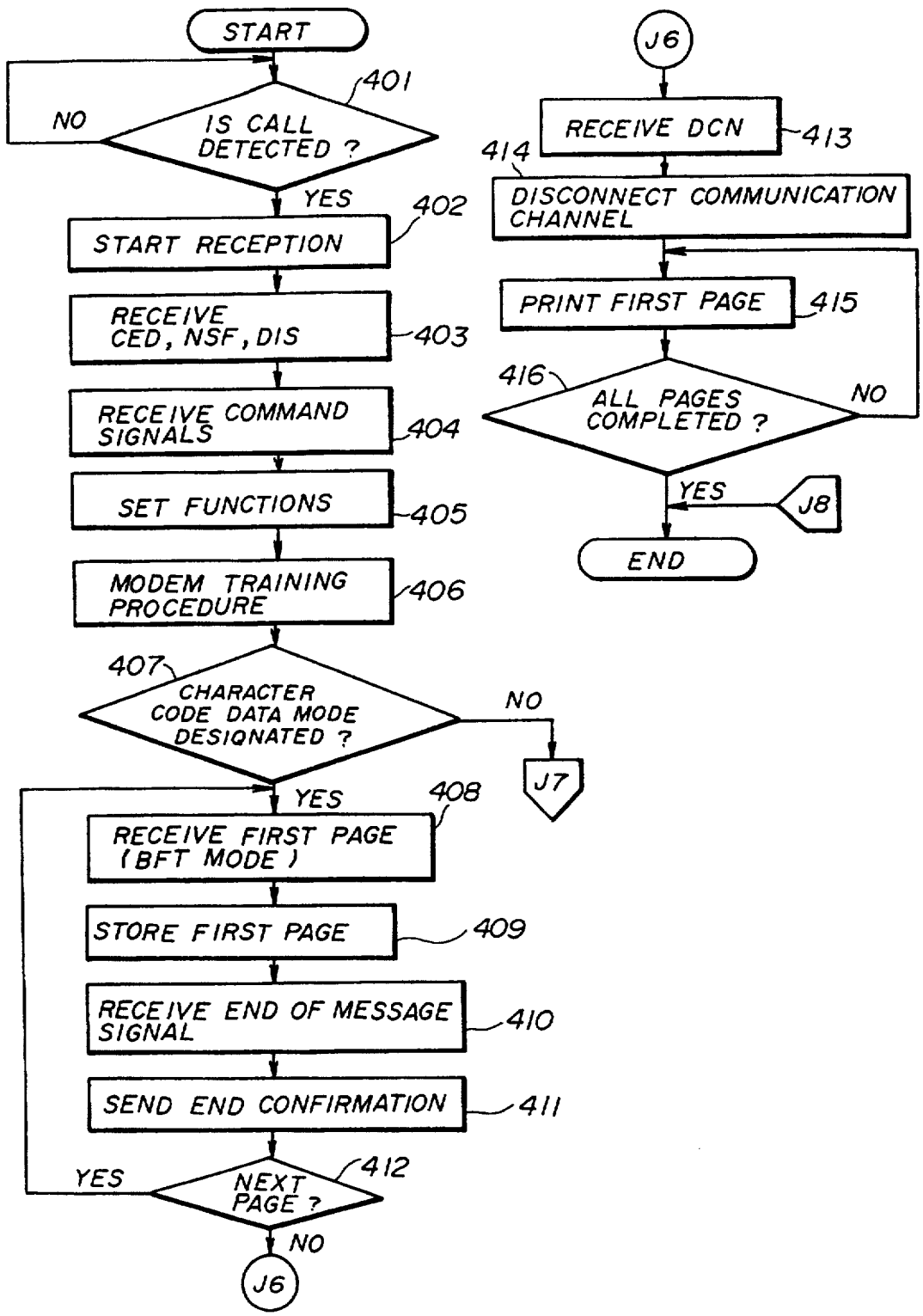
FIGS. 7 and 8 are parts of a flowchart of a receiving operation of the facsimile apparatus according to the second embodiment of the present invention.
Figure 8:
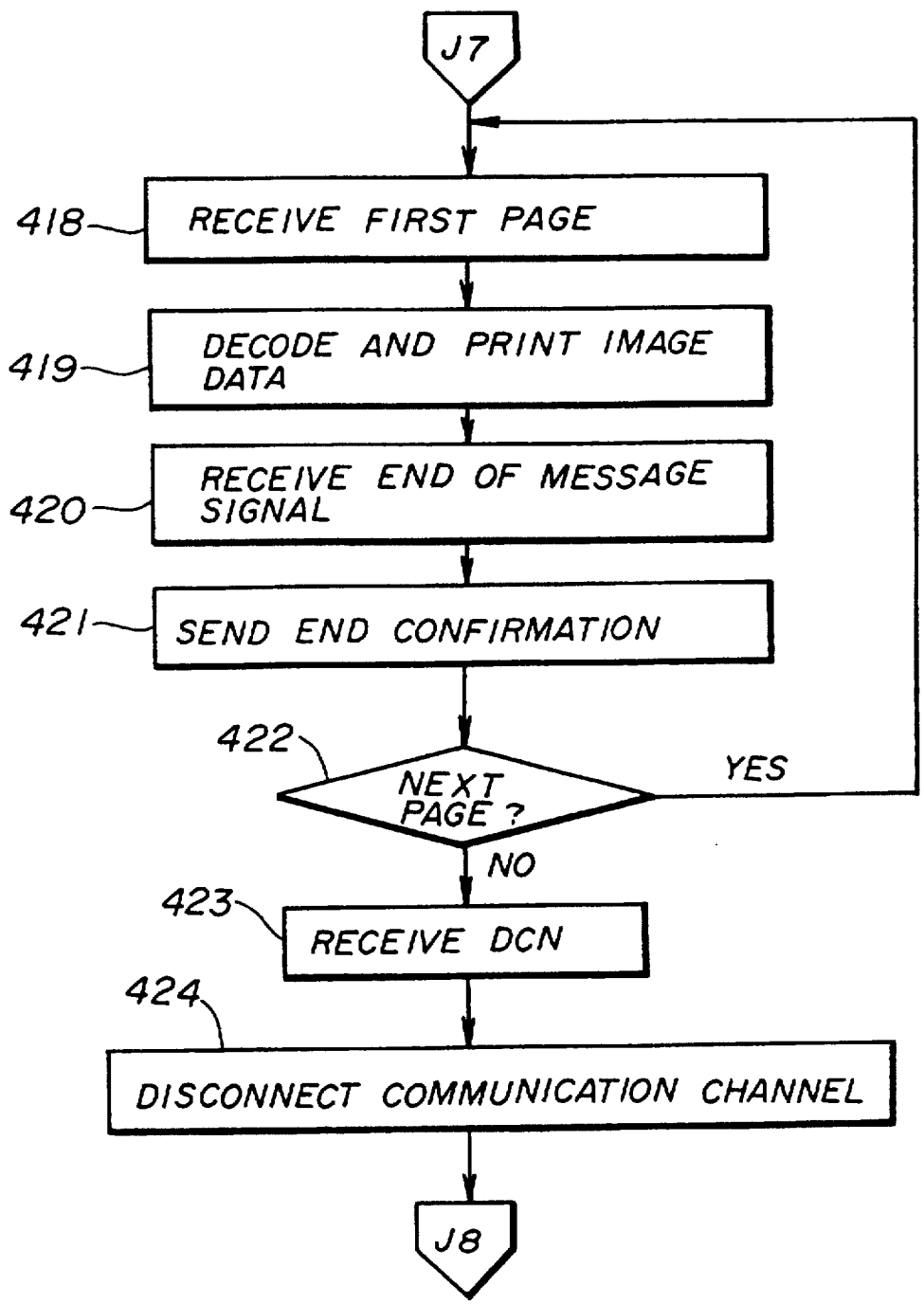

FIGS. 7 and 8 are parts of a flowchart of an operation performed when the facsimile apparatus according to the present embodiment receives image data from a remote terminal.

When the operation shown in FIGS. 7 and 8 is started, it is determined, in step 401, whether or not a call is received. If a call from a remote terminal is detected, a response is started in step 402. In step 403, a predetermined call identification signal CED, a non-standard facilities signal and a digital identification signal DIS are sent to the remote terminal which is the calling terminal. Information indicating possession of an OCR function and a printing function of character code data is provided in an information field of the non-standard facilities signal NSF.

Then, in step 404, command signals including a non-standard facilities set-up signal NSS sent from the remote terminal are received to recognize apparatus functions and transmission functions to be used. In step 405, each part of the facsimile apparatus is set to perform the functions. In step 406, a modem training procedure is executed at a designated modem speed so as to determine the modem speed to be used.

It is then determined, in step 407, whether or not the character code data recording mode is designated by the remote terminal. If it is determined that the character code data recording mode is designated, the routine proceeds to step 408. In step 408, character code data corresponding to a single page of the original document is received, and then the received character code data is stored in step 409. When an end of message signal is received in step 410, a message confirmation signal is sent to the remote terminal in step 411.

It is then determined, in step 412, whether or not character code data corresponding to a next page is to be sent from the remote terminal. If it is determined that the character code data corresponding to a next page is to be sent from the remote terminal, the routine returns to step 408 so as to receive the character code data corresponding to the next page. If it is determined that there is not a next page of the original document, a disconnection signal DCN is received in step 413, and then the communication channel is disconnected in step 414.

When the receiving operation of the character code data is completed as mentioned above, the printer 6 is set to the character code data recording mode, and then the received character code data corresponding to a single page is supplied, in step 416, to the printer 6 so as to print out character images corresponding to the character code data.

It is then determined, in step 416, whether or not the printing operation of the character code data corresponding to all pages received from the remote terminal has been completed. If it is determined that there is remaining image data for another page, the routine returns to step 415 so as to print out another page. If it is determined, in step 416, that there is no remaining image data to be printed, the routine is ended.

On the other hand, if it is determined, in step 407, that the character code data recording mode is not designated, the routine proceeds to step 418 (refer to FIG. 8). In step 418, image data corresponding to a single page of the original document is received. In step 419, the received image data is decoded by the encoding/decoding unit 10, and the printer 6 is set to the image recording mode and the decoded image data is supplied to the printer 6 so as to print out the image data in the image recording mode. Then, after an end of message is received in step 420, a message confirmation signal is sent to the remote terminal in step 421.

It is then determined, in step 422, whether or not character code data corresponding to a next page is to be sent from the remote terminal. If it is determined that the character code data corresponding to a next page is to be sent from the remote terminal, the routine returns to step 418 so as to receive the image data corresponding to the next page. If it is determined that there is not a next page of the original document, a disconnection signal DCN is received in step 423, and then the communication channel is disconnected in step 424, and the routine is ended.

As discussed above, in the present embodiment, when the user instructs that the OCR process is applicable to the image data and the receiver side has the OCR function, the image data obtained by the scanner 5 is sent in the BFT transmission mode after the image data is converted into character code data. Thus, the transmitted data amount is greatly reduced, resulting in a great reduction in a communication cost. Additionally, the printed image output from the printer 6 has high image quality since the image data is transmitted after it is converted into the character code data when the image data contains only character images. Further, if the image data to be transmitted includes image data corresponding to an illustration or a photograph which cannot be applied with the OCR process, the user can input information indicating that the image data is not applicable with the OCR process. Thus, the image data obtained by the scanner 5 is transmitted without conversion, and an appropriate printing mode is selected for the received image data on the receiver side.

A description will now be given of a third embodiment according to the present invention.

Figure 9:
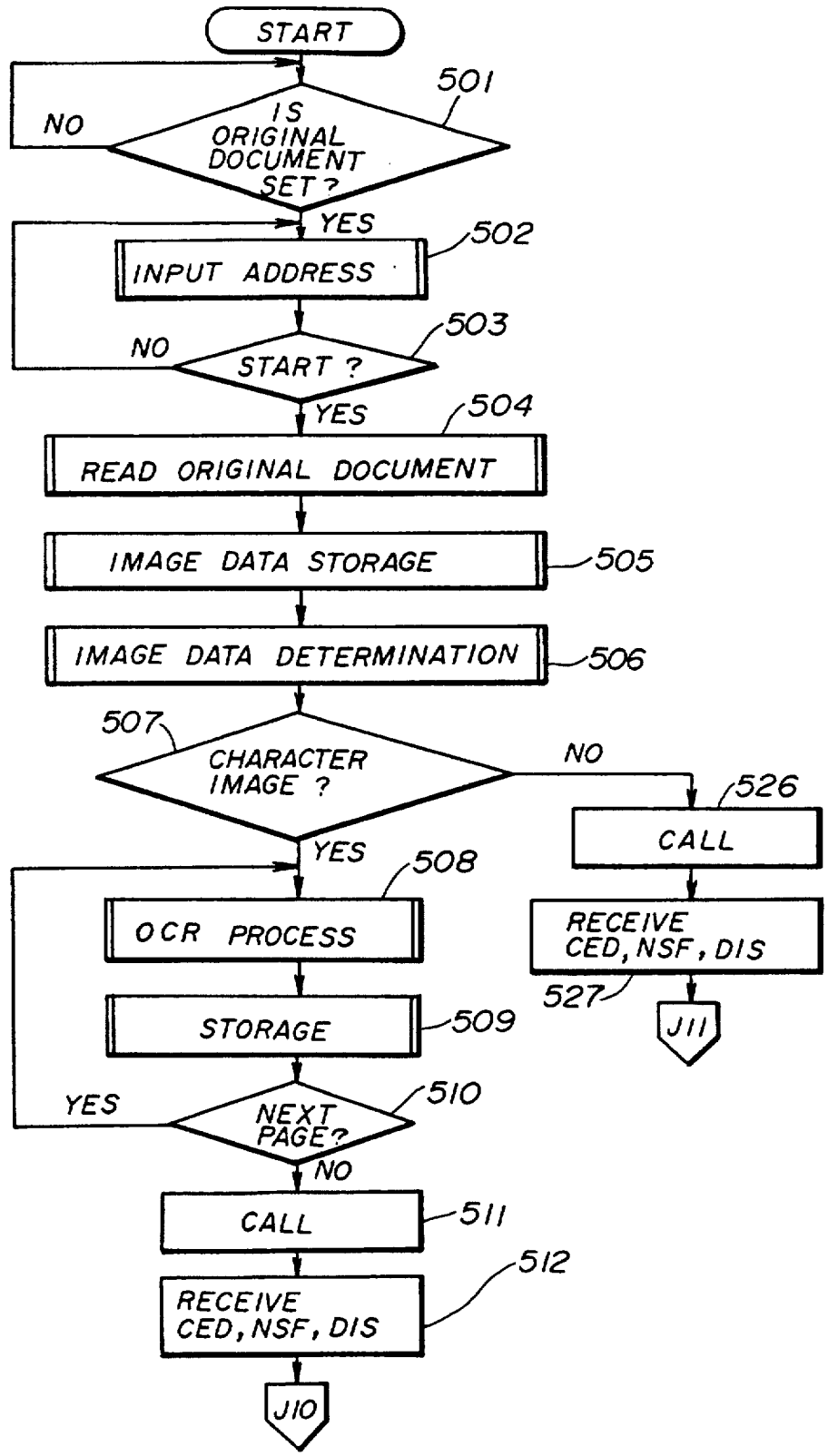
FIGS. 9 and 10 are parts of a flowchart of a transmitting operation of a facsimile apparatus according to a third embodiment of the present invention.
Figure 10:
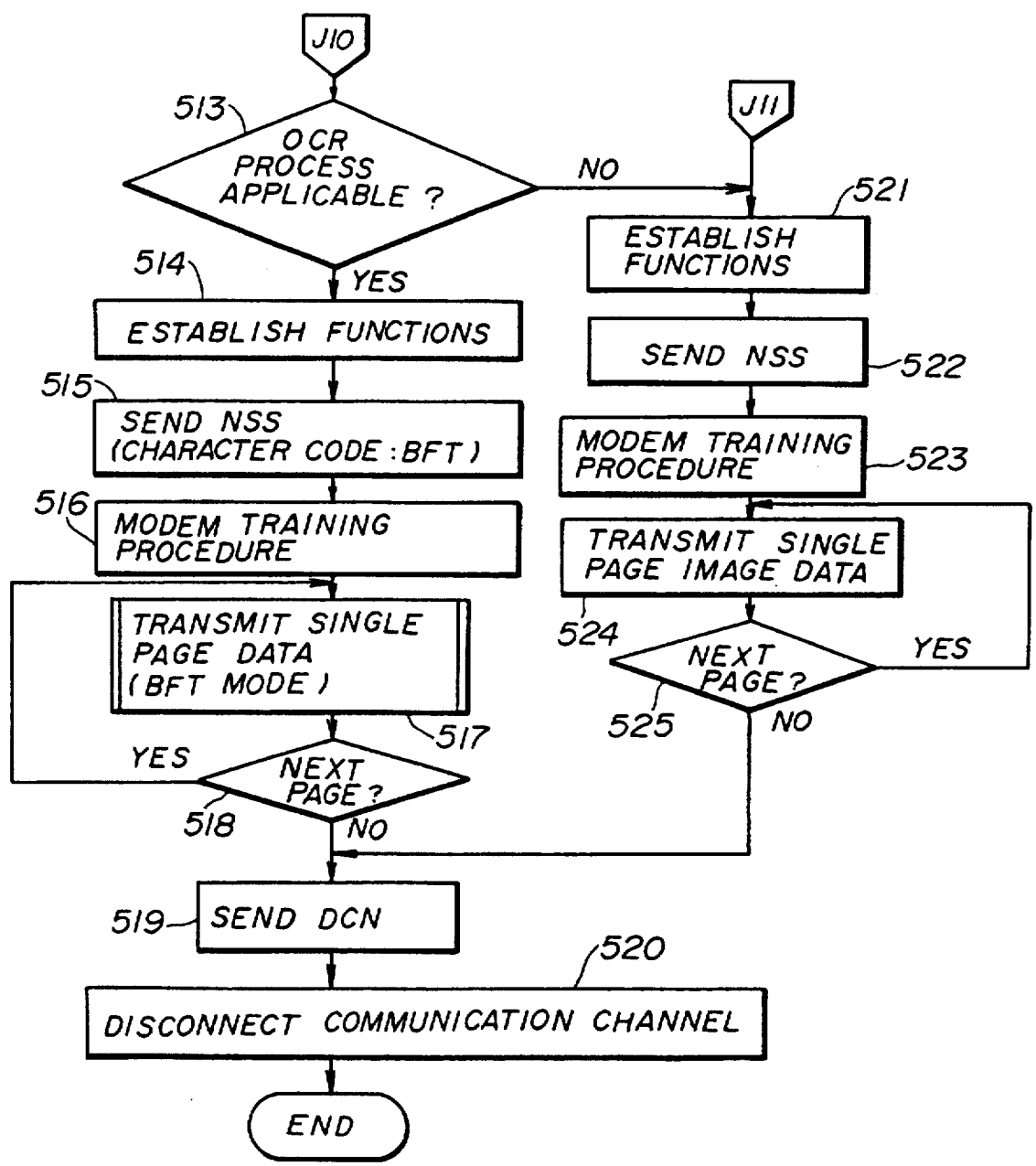

In the above-mentioned first and second embodiments, instruction as to applicability of the OCR process is input by the user. In the third embodiment of the present invention, applicability of the OCR process is automatically determined by the facsimile apparatus based on image data obtained by the scanner. FIGS. 9 and 10 are parts of a flowchart of an operation of the facsimile apparatus according to the third embodiment of the present invention. The operation shown in FIGS. 9 and 10 is performed when image data of an original document is transmitted to a remote terminal. It should be noted that a hardware structure of the facsimile apparatus according to the third embodiment is the same as that of the first embodiment, and the description thereof will be omitted.

When the operation shown in FIGS. 9 and 10 is started, it is determined, in step 501, whether or not an original document is set in the scanner 5. If it is determined that the original document is set in the scanner 5, the routine proceeds to step 502. In step 502, a dial number (address) is input by the user. It is then determined, in step 503, whether or not the start key is pressed. If it is determined that the start key is pressed, the routine proceeds to step 504. In step 504, a reading operation for the original document by the scanner 5 is started. In step 505, image data for all pages of the original document is stored. In step 506, a determining operation is performed on the image data for all pages by the image processing unit 8. In step 507, it is determined whether or not the read image data corresponds to a character image.

If it is determined that the image data corresponds to the character image, the routine proceeds to step 508. In steps 508, 509 and 510, the OCR process is applied to the image data for all pages. If it is determined, in step 510, that there is no remaining image data to be processed, the routine proceeds to step 511. In step 511, a calling operation is started according to the dial number input in step 502.

In step 512, the facsimile apparatus receives a called station identification signal CED (a tone signal), a non-standard facilities signal NSF (a binary signal) and a digital identification signal DIS (a binary signal) from the called terminal.

In step 513, the system control unit 1 determines whether or not the non-standard facilities signal NSF includes information indicating that the remote terminal has a function to print out the image data in the character code data printing mode. If it is determined that the non-standard facilities signal NSF includes such information, the routine proceeds to step 514. In step 514, the system control unit 1 establishes a transmission function and an apparatus function to be used. In this case, designation of a character code data recording may be set as an apparatus function and a modem speed, a resolution of image, an encoding mode, a transfer mode (BFT in this case) and an image size may be set as transmission functions which are necessary for transmitting image information.

Then, in step 515, a non-standard facilities set-up signal NSS is generated and sent so as to notify the remote terminal of the transmission function and the apparatus function that has been established in the local terminal. In step 516, a modem training procedure is executed at a designated modem speed so as to determine the modem speed to be used.

After the preparation for transmitting image information is completed as mentioned above, the character code data for each page of the original document is transmitted page by page in accordance with a predetermined BFT transmission mode procedure, in steps 517 and 518. If it is determined, in step 518, that there are no remaining pages, the routine proceeds to step 519. In step 519, a disconnect signal DCN is sent to the remote terminal. Thereafter, the communication channel is disconnected in step 520, and the routine is ended.

If the determination in step 513 is negative, the routine proceeds to step 521. In step 521, the system control unit 1 establishes transmission functions and apparatus functions to be used. Then, in step 522, a non-standard facilities set-up signal NSS is generated and sent so as to notify the remote terminal of the transmission function and the apparatus function that has been established in the local terminal. In step 523, a modem training procedure is executed at a designated modem speed so as to determine the modem speed to be used.

After the preparation for transmitting image information is completed as mentioned above, the image data for each page of the original document is encoded and compressed according to the designated encoding mode and transmitted page by page, in steps 524 and 525. If it is determined, in step 524, that there is no remaining pages, the routine proceeds to step 519. In step 519, a disconnect signal DCN is sent to the remote terminal. Thereafter, the communication channel is disconnected in step 520, and the routine is ended.

In the present embodiment, since the instruction of the applicability of the OCR process to the image data is not necessarily input by the user, labor of the user is reduced and an efficient data transmission can be achieved. It may be previously designated by a specific operation as to whether or not the input of the instruction regarding the applicability of the OCR process is input by a user.

A description will now be given of a fourth embodiment of the present invention.

Figure 11:
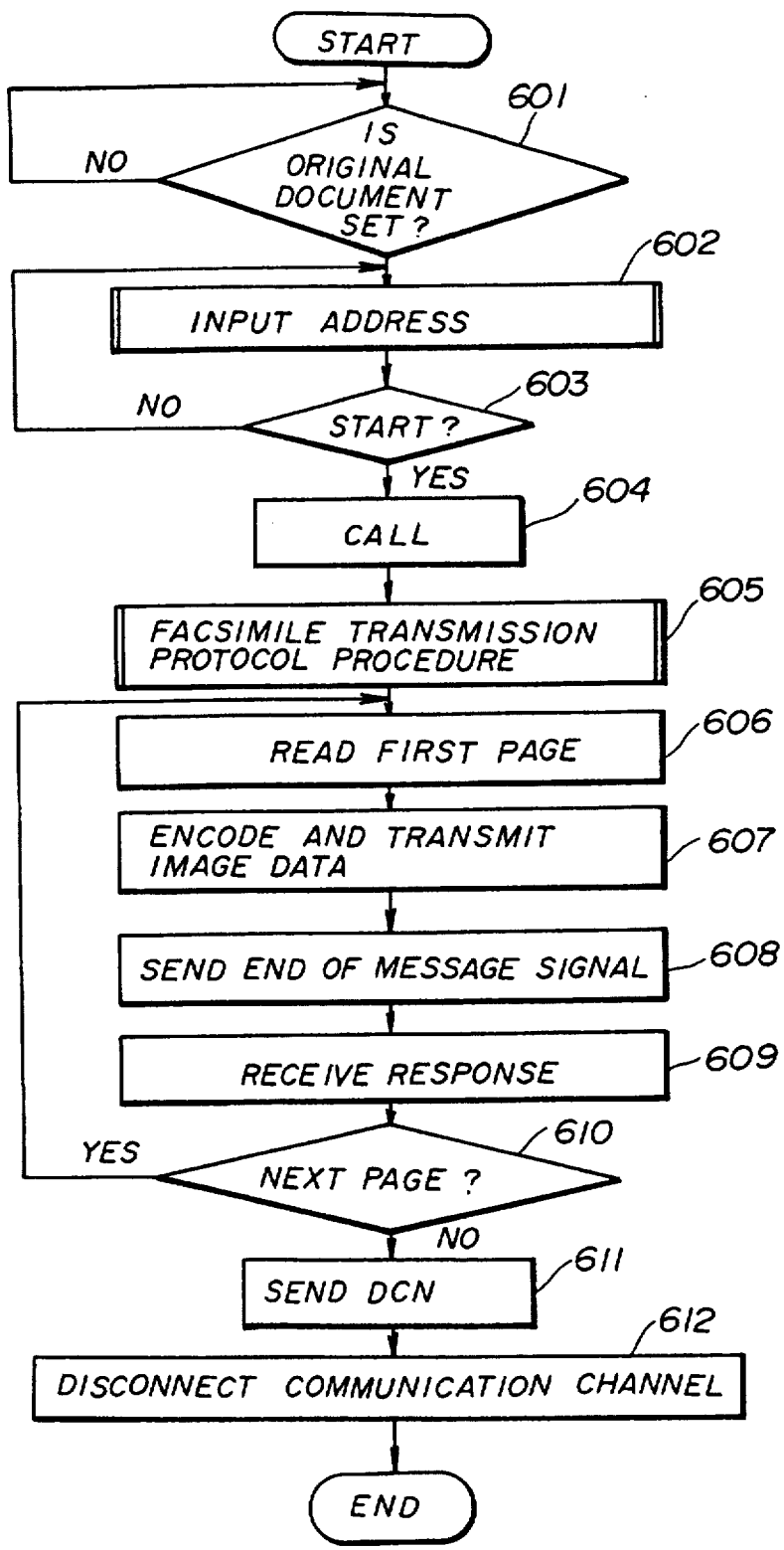
FIG. 11 is a flowchart of a transmitting operation of a facsimile apparatus according to a fourth embodiment of the present invention.

In the above-mentioned third embodiment, applicability of the OCR process is automatically determined on the transmitter side and is notified to the receiver side. However, the applicability of the OCR process can be determined on the receiver side as is the case in the fourth embodiment. FIG. 11 is a flowchart of an operation of the facsimile apparatus according to the fourth embodiment of the present invention. The operation shown in FIG. 11 is performed when image data of an original document is transmitted to a remote terminal. It should be noted that a hardware structure of the facsimile apparatus according to the fourth embodiment is the same as that of the first embodiment, and the description thereof will be omitted.

When the operation shown in FIG. 11 is started, it is determined, in step 601, whether or not an original document is set in the scanner 5. If it is determined that the original document is set in the scanner 5, the routine proceeds to step 602. In step 602, a dial number (address) is input by the user. It is then determined, in step 603, whether or not the start key is pressed. If it is determined that the start key is pressed, the routine proceeds to step 604. In step 604, a calling operation is started according to the dial number input in step 602. In step 604, a preparation for transmission of image information is performed by executing a predetermined facsimile communication protocol procedure.

After the preparation for transmitting image information is completed as mentioned above, a first page of the original document is read, in step 606, by the scanner 5. Then, in step 607, the image data output from the scanner 5 is encoded and compressed according to the designated encoding mode, and the encoded and compressed image data is sent to the remote terminal. Thereafter, an end of message signal is sent, in step 608, to the remote terminal. In step 609, a message confirmation signal is received from the remote terminal.

It is then determined, in step 610, whether or not a next page of the original document is present. If there is a next page, the routine returns to step 606 so as to transmit image data of the next page. If it is determined, in step 610, that there is not a next page, the routine proceeds to step 611 so as to send a disconnect signal DCN to the remote terminal. Thereafter, the communication channel is disconnected in step 612, and the routine is ended.

Figure 12:
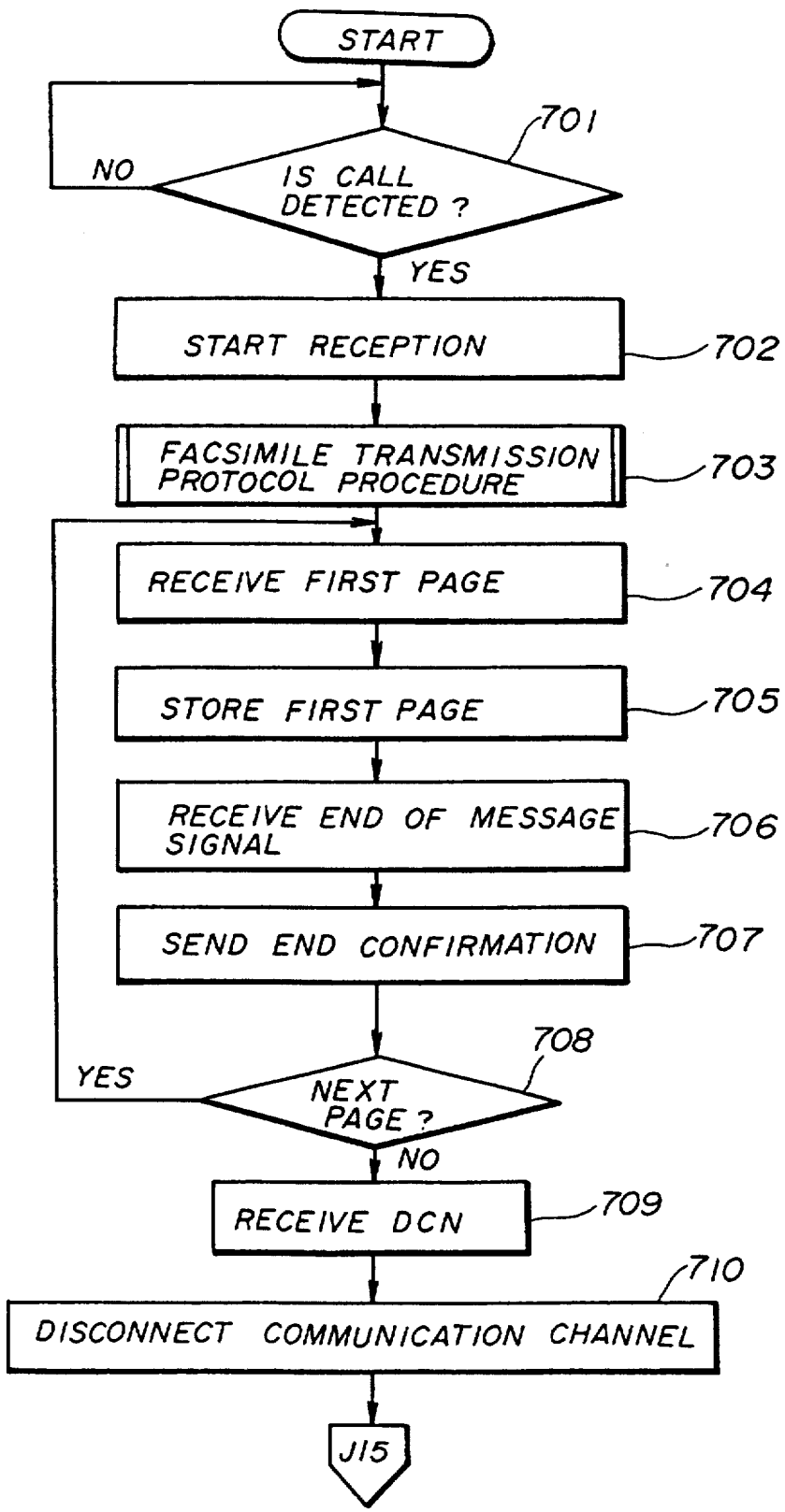
FIGS. 12 and 13 are parts of a receiving operation of the facsimile apparatus according to the fourth embodiment of the present invention.
Figure 13:
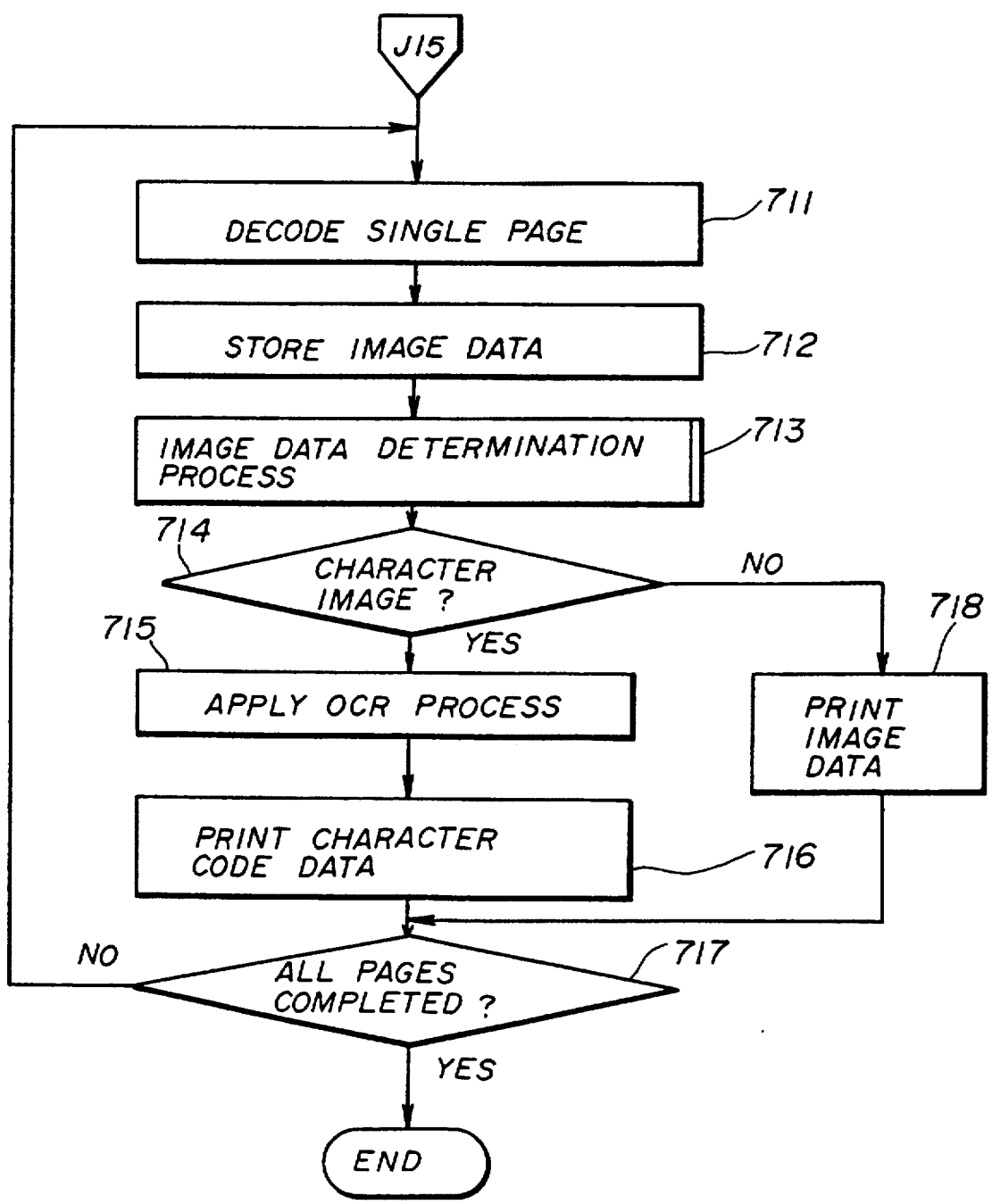

FIGS. 12 and 13 are parts of an operation of the facsimile apparatus according to the fourth embodiment of the present invention. This operation is performed when the facsimile apparatus receives image data from a remote terminal.

When the operation shown in FIGS. 12 and 13 is started, it is determined, in step 701, whether or not a call is received. If a call from a remote terminal is detected, a response is started in step 702. In step 703, a predetermined facsimile transmission protocol procedure is executed to prepare for the subsequent transmission of image data. Then, image data corresponding to a single page of an original document is received in step 704, and the received image data is stored in step 705. When an end of message signal is received in step 706, a message confirmation signal is sent to the remote terminal in step 707.

It is then determined, in step 708, whether or not image data corresponding to a next page is to be sent from the remote terminal. If it is determined that the image data corresponding to a next page is to be sent from the remote terminal, the routine returns to step 704 so as to receive the image data corresponding to the next page. If it is determined that there is not a next page of the original document, a disconnection signal DCN is received in step 709, and then the communication channel is disconnected in step 710.

Then, the image data corresponding to a single page of the original document is decoded by the encoding/decoding unit 10. The decoded image data is stored in step 712. In step 713, a determination process is applied to the image data, and it is determined, in step 714, whether or not the image data corresponds to a character image. If it is determined that the image data corresponds to the character image, the routine proceeds to step 715. In step 715, the OCR process is applied to the image data so as to generate character code data corresponding to the image data. The character code data is supplied, in step 716, to the printer 6 so as to print out the image data of the original document.

It is then determined, in step 717, whether or not the printing operation of the image data corresponding to all pages received from the remote terminal has been completed. If it is determined that there is remaining image data for another page, the routine returns to step 711 so as to print out another page. If it is determined, in step 717, that there is no remaining image data to be printed, the routine is ended.

If it is determined, in step 714, that the image data does not correspond to the character image, the routine proceeds to step 718. In step 718, the image data stored in step 712 is supplied to the printer 6 without applying the OCR process so as to print out the image data. Then the routine proceeds to step 717 so as to determined whether or not the printing operation of the image data corresponding to all pages received from the remote terminal has been completed.

A description will now be given of a fifth embodiment of the present invention.

In the above-mentioned fourth embodiment, it is determined on the receiver side as to whether or not the OCR process is to be used based on the received and decoded image data. This method requires a time for the determination. In order to eliminate such a time spent on the determination, the transmitter may notify the receiver of the image mode used when the original document is read so that the receiver side determines whether or not the OCR process is to be used based on the notified image mode. The fifth embodiment is related to such a method.

In the fifth embodiment, the transmitter side performs the same transmitting operation as that of the operation shown in FIG. 11 except for the transmission protocol procedure in step 605. In the fifth embodiment, information indicating an image reading mode is included in the non-standard facilities set-up signal NSS. As for the types of the image reading mode, there are a character reading mode, a halftone mode, etc.

Figure 14:
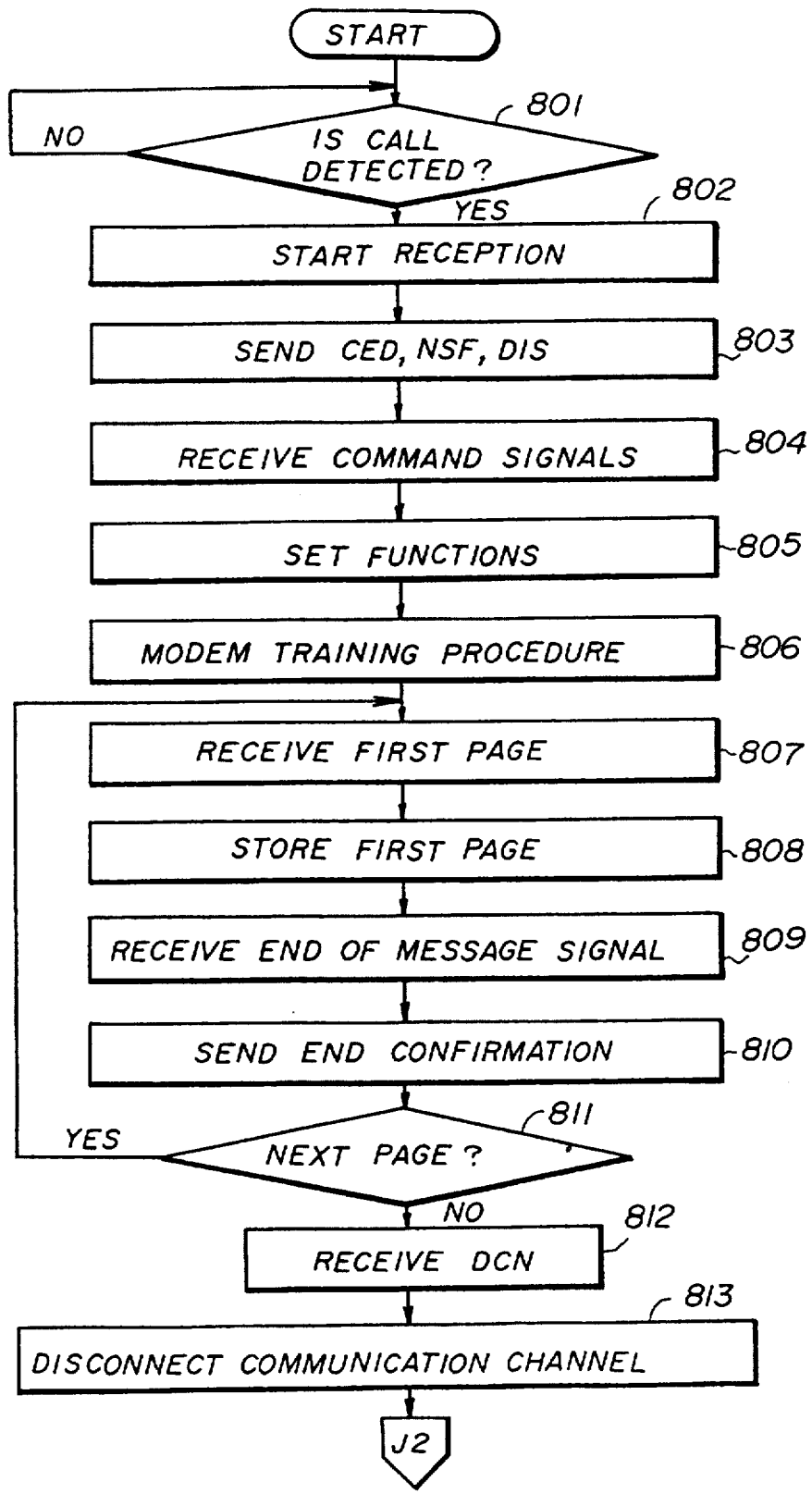
FIGS. 14 and 15 are parts of a receiving operation of a facsimile apparatus according to a fifth embodiment of the present invention.
Figure 15:
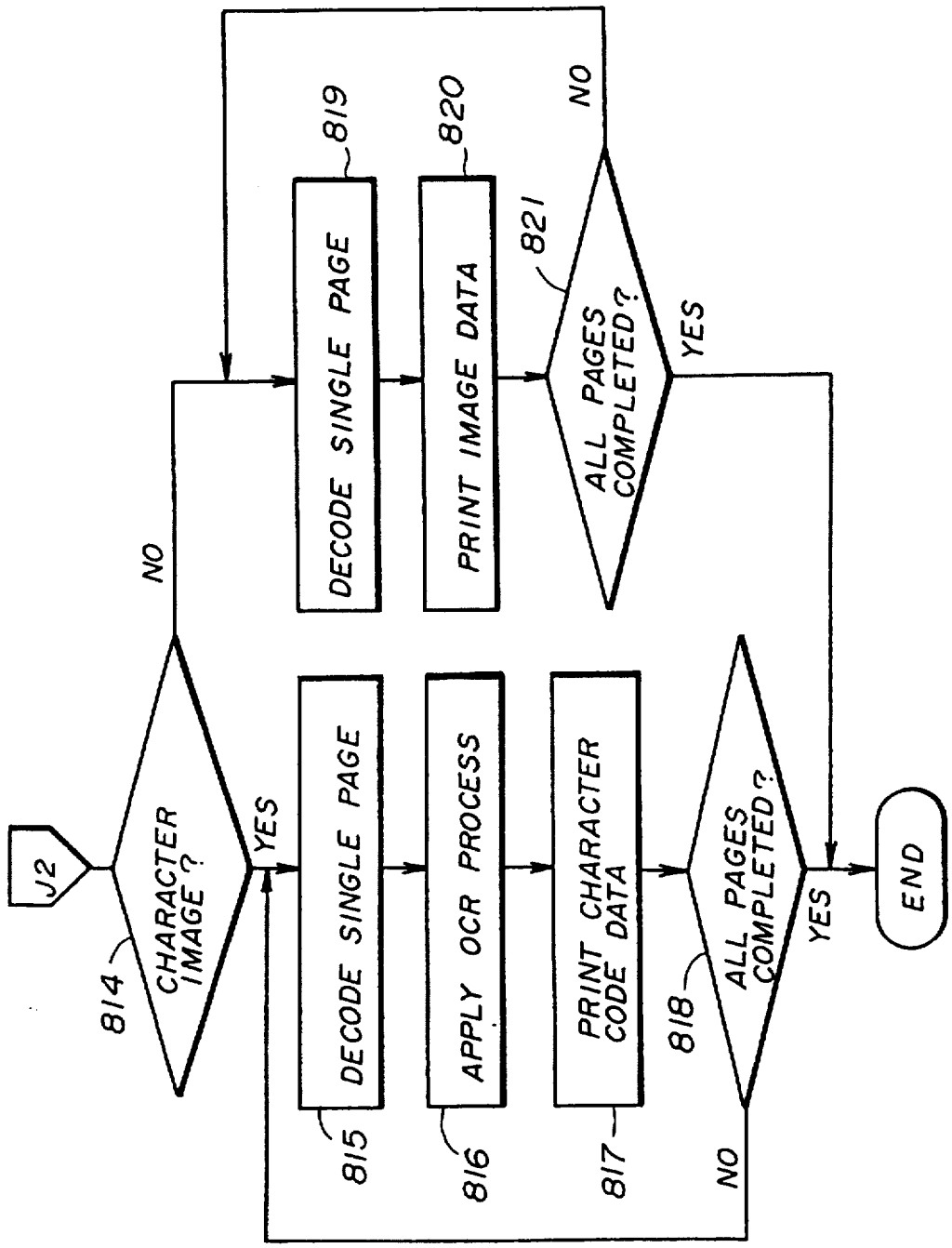

FIGS. 14 and 15 are parts of a flowchart of an operation performed by the facsimile apparatus according to the fifth embodiment of the present invention. The operation shown in FIGS. 14 and 15 is performed when the image data is received from a remote terminal. That is this operation is performed when the facsimile apparatus is on a receiver side.

When the operation shown in FIGS. 3 and 4 is started, it is determined, in step 801, whether or not a call is received. If a call from a remote terminal is detected, a response is started in step 802. In step 803, a predetermined call identification signal CED, a non-standard facilities signal and a digital identification signal DIS are sent to the remote terminal which is the calling terminal. Information indicating possession of an OCR function and a printing function of character code data is provided in an information field of the non-standard facilities signal NSF.

Then, in step 804, command signals including a non-standard facilities set-up signal NSS sent from the remote terminal are received to recognize apparatus functions and transmission functions to be used. In step 805, each part of the facsimile apparatus is set to perform the functions. In step 806, a modem training procedure is executed at a designated modem speed so as to determine the modem speed to be used.

Then, image data corresponding to a single page of the original document is received in step 807, and the received image information is stored in step 808. When an end of message signal is received in step 809, a message confirmation signal is sent to the remote terminal in step 810.

It is then determined, in step 811, whether or not image data corresponding to a next page is to be sent from the remote terminal. If it is determined that the image information corresponding to a next page is to be sent from the remote terminal, the routine returns to step 807 so as to receive the image data corresponding to the next page. If it is determined that there is not a next page of the original document, a disconnection signal DCN is received in step 812, and then the communication channel is disconnected in step 813.

It is then determined, in step 814, whether or not the image reading mode notified by the transmitter side indicates a mode representing generation of character image data. If it is determined that the determination in step 814 is affirmative, the received image data corresponding to a single page is decoded by the encoding/decoding unit 10 in step 815. Then the OCR process is applied to the decoded image data, in step 816, so as to generate character code data corresponding to the image data. The character code data is supplied, in step 817, to the printer 6 so as to print out the image data of the original document.

It is then determined, in step 818, whether or not the printing operation of the image data corresponding to all pages received from the remote terminal has been completed. If it is determined that there is remaining image data for another page, the routine returns to step 815 so as to print out another page. If it is determined, in step 818, that there is no remaining image data to be printed, the routine is ended.

On the other hand, if the determination in step 814 is negative, the routine proceeds to step 819. In step 819, the received image data is decoded by the encoding/decoding unit 10. In step 820, the printer 6 is set in an image recording mode and the decoded image data is supplied to the printer 6 so as to print out the image data in the image recording mode.

It is then determined, in step 821, whether or not the printing operation of the image data corresponding to all pages received from the remote terminal has been completed. If it is determined that there is remaining image data for another page, the routine returns to step 819 so as to print out another page. If it is determined, in step 821, that there is no remaining image data to be printed, the routine is ended.

Accordingly, in the fifth embodiment, it can be recognized in a short time whether or not image data received from a remote terminal is of a character image. Thus, a recording time for outputting the received image data can be reduced.

It should be noted that in the above mentioned embodiments, although the OCR processing unit 9 is provided separately in the facsimile apparatus, a scanner having the OCR function or a printer having the OCR function may be used.

In the above-mentioned embodiments, the character code data obtained by the OCR process on the transmitter side is directly transmitted to the receiver side. However, the character code data may be converted into file data having a predetermined format used by a specific document processing system. In such a case, the receiver side must have a function to interpret the file data.

Additionally, in the above-mentioned embodiments, the character code data is directly supplied to the printer. Image data corresponding to the character code data may be generated by the image processing unit, and the image data may be supplied to the printer. In such a case, the printer is not necessarily provided with a function to record a character image from the character code data.

The present invention is not limited to the specifically disclosed embodiments, and variations and modifications may be made without departing from the scope of the present invention.

What is claimed is:

1. An image information communication apparatus communicating with a remote terminal through a communication network, a predetermined communication protocol procedure being executed to establish a communication channel, the image information communication apparatus comprising:

image input means for inputting image data to be transmitted, the image data being obtained by raster scanning an original document;

transmission means for transmitting said image data to the remote terminal through said communication network; and notification means for receiving from said remote terminal a notice in a non-standard facilities signal NSF that said remote terminal is equipped with an optical character reading process, and when the notice is received for notifying said remote terminal during a return non-standard facilities signal NSF that the image data to be transmitted to said remote terminal is image data on which an optical character reading process is applicable, said optical character reading process being applied to convert raster image data corresponding to characters into predetermined character code data at said remote terminal when the optical character reading process is applicable to the transmitted image data.

2. The image information communication apparatus as claimed in claim 1, further comprising instruction input means for inputting an instruction indicating that the optical character reading process is applicable to the image data to be transmitted, said instruction being input by a user of said image information communication apparatus.

3. The image information communication apparatus as claimed in claim 2, further comprising inquire means for inquiring of a user whether or not the optical character reading process is applicable to the image data to be transmitted by displaying a message to said user.

4. The image information communication apparatus as claimed in claim 1, wherein said notification information is included in a protocol signal for establishing the communication channel.

5. The image information communication apparatus as claimed in claim 1, further comprising:

first conversion means for applying the optical character reading process to image data received from the remote terminal based on said notification information received from the remote terminal so as to obtain character code data corresponding to the image data received from said remote terminal.

6. The image information communication apparatus as claimed in claim 5, further comprising a printer printing a character image based on said character code data.

7. The image information communication apparatus as claimed in claim 5, further comprising means for sending to said remote terminal response information indicating that said image information communication apparatus has a function to perform the optical character reading process.

8. The image information communication apparatus as claimed in claim 7, wherein said response information is included in a protocol signal for establishing the communication channel.

9. The image information communication apparatus as claimed in claim 7, further comprising second conversion means for applying the optical character reading process to the image data to be transmitted so as to obtain character code data corresponding to the image data to be transmitted when said response information is received from said remote terminal and when said instruction is input by the user.

10. The image information communication apparatus as claimed in claim 9, further comprising a printer printing a character image based on character code data received from said remote terminal.

11. The image information communication apparatus as claimed in claim 1, further comprising means for determining applicability of the optical character reading process to the image data to be transmitted.

12. The image information communication apparatus as claimed in claim 1, further comprising means for determining applicability of the optical character reading process to image data received from said remote terminal.

13. The image information communication apparatus as claimed in claim 1, wherein said notification information includes information regarding an image reading mode used when the image data to be transmitted is generated.

14. The image information communication apparatus as claimed in claim 13, wherein said image reading mode includes an optical character reading mode and a halftone mode.

15. The image information communication apparatus as claimed in claim 1, wherein said image information communication apparatus is a facsimile apparatus.

16. The image information communication apparatus as claimed in claim 15, wherein said facsimile apparatus is a G3 facsimile apparatus.

* * * * *